US009201765B2

(12) United States Patent
Muske

(10) Patent No.: US 9,201,765 B2
(45) Date of Patent: Dec. 1, 2015

(54) SYSTEM AND METHOD TO FACILITATE A USER INTERFACE ENABLED REVIEW OF STATIC ANALYSIS WARNINGS

(71) Applicant: Tata Consultancy Services Limited, Maharashtra (IN)

(72) Inventor: Tukaram B. Muske, Pune (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 0 days.

(21) Appl. No.: 14/526,724

(22) Filed: Oct. 29, 2014

(65) Prior Publication Data
US 2015/0121345 A1 Apr. 30, 2015

(30) Foreign Application Priority Data
Oct. 31, 2013 (IN) .......................... 3461/MUM/2013

(51) Int. Cl.
G06F 9/44 (2006.01)
G06F 11/36 (2006.01)

(52) U.S. Cl.
CPC ........ *G06F 11/3664* (2013.01); *G06F 11/3604* (2013.01)

(58) Field of Classification Search
USPC .................................................. 717/123–129
See application file for complete search history.

(56) References Cited

U.S. PATENT DOCUMENTS

| | | | | |
|---|---|---|---|---|
| 5,313,616 A * | 5/1994 | Cline | .................. | G06F 11/3612 713/323 |
| 6,128,774 A * | 10/2000 | Necula et al. | ................. | 717/146 |
| 6,560,774 B1 * | 5/2003 | Gordon et al. | ................. | 717/146 |
| 7,140,004 B1 * | 11/2006 | Kunins | ....................... | G06F 8/20 379/29.02 |
| 7,383,541 B1 * | 6/2008 | Banks | ....................... | G06F 8/65 717/126 |
| 7,596,778 B2 * | 9/2009 | Kolawa et al. | ................. | 717/126 |
| 7,614,044 B2 * | 11/2009 | Bhansali et al. | ............... | 717/145 |
| 7,827,534 B2 * | 11/2010 | Vetillard | ............. | G06F 11/3608 717/124 |
| 7,913,232 B2 * | 3/2011 | Erkkinen | ............. | G06F 11/3672 717/125 |
| 8,122,436 B2 * | 2/2012 | Costa et al. | ................... | 717/128 |
| 8,387,015 B2 * | 2/2013 | Christensen | ........ | G06F 11/3668 717/124 |
| 8,453,116 B2 | 5/2013 | Logozzo et al. | | |
| 8,468,502 B2 * | 6/2013 | Lui | ..................... | G06F 11/3612 717/125 |
| 8,782,607 B2 * | 7/2014 | Andersen | ............ | G06F 11/0793 717/101 |
| 8,881,116 B2 * | 11/2014 | Mulat | ........................... | 717/131 |
| 8,924,782 B2 * | 12/2014 | Locasto et al. | .................. | 714/15 |
| 8,997,065 B2 * | 3/2015 | Karr | ......................... | G06F 8/75 712/220 |

FOREIGN PATENT DOCUMENTS

WO WO2009095741 A1 8/2009

OTHER PUBLICATIONS

Feng et al, "Modular Verification of Assembly Code with Stack-Based Control Abstractions", ACM, pp. 401-414, 2006.*
Post et al, "Reducing False Positives by Combining Abstract", IEEE, pp. 188-197, 2008.*
Cai et al, "Certified Self-Modifying Code", ACM, pp. 66-77, 2007.*
Andronick et al, "Large-Scale Formal Verification in Practice: A Process Perspective", IEEE, 1002-1011, 2012.*
Dr. Alain Deutsch (Polyspace Technologies), "Static Verification of Dynamic Properties" Nov. 27, 2003.

* cited by examiner

*Primary Examiner* — Anil Khatri
(74) *Attorney, Agent, or Firm* — Thompson Hine LLP

(57) ABSTRACT

A system and method for facilitating verification of software code. A first program point is selected, from the software code, indicating static analysis warning to be reviewed. Further, review-assisting information including at least one of a set of modification points and a controlling condition are determined for the user to judge whether the warning generated is safe or unsafe. From the set of modification points, non-useful modification points may be filtered out in order to determine only relevant modification points. After filtering, the system presents the review-assisting information (relevant modification points and controlling conditions) in a systematic manner to the user for facilitating verification of the software code.

9 Claims, 9 Drawing Sheets

302

```
1.  int a, b, c;
2.  int foo1()
3.  {
4.     int v1, v2, v3;
5.     ...
6.     a = v1+v2; // values computed by "v1+v2" are not known statically
7.     func();
8.  }

9.  int foo2()
10. {
11.    char* str;
12.    ...
13.    a = strlen(str);
14.    Func();
15. }

16. void func()
17. {                    ──304
18.    c = b/a;  // Warning Point of interest for the Divide by Zero verification
19. }
```

```
1.  int a, b, c;
2.  int * ptr;
3.  int foo1()
4.  {
5.      fscanf("%d", &a); // at this point no information is available about the values of the "a"
6.      ...
7.      b = getInterval(); // this function assigns values from 10 to 100 to the variable "b"
8.      *ptr = &b;
9.      func();
10. }

11. void func()
12. {
13.     if( a == *ptr)
14.     {
15.         c = tempVar/a; // Warning Point of interest for the Divide by Zero verification
16.     }
17. }
```

```
1.  int a=0, b, c;
2.  int arr[10];
3.
4.
5.  int foo()
6.  {
7.     a = 5;
8.     c = ...;   //values assigned to 'c' are always (0..9) and it be analyzed
       manually at this point
9.     ... // 'a' and 'c' are not modified
10.    foo1();
11. }
12.
13. int foo1()
14. {
15.    b = c;
16.    func();
17. }
18.
19. int foo2()
20. {
21.    b = 5;
22.    Func();
23. }

24. void func()          320
25. {
26.    a = b;   // values taken by "b" are not known statically
27.    c = arr[a];// Warning Point of interest for the Array Index Out of
       Bound verification
28. }
```

Figure 3E

SYSTEM AND METHOD TO FACILITATE A USER INTERFACE ENABLED REVIEW OF STATIC ANALYSIS WARNINGS

CROSS-REFERENCE TO RELATED APPLICATIONS AND PRIORITY

The present application claims priority to Indian Provisional Patent Application No. 3461/MUM/2013, filed on 31 Oct. 2013, the entirety of which is hereby incorporated by reference.

TECHNICAL FIELD

The present subject matter described herein, in general, relates to systems and methods for facilitating a user-interface enabled verification of a software code.

BACKGROUND

Static analysis (or static analysis tools) has been found useful and effective in detecting common programming bugs such as Division by Zero, Buffer Overflow, Array Index Out of Bound, and Null/Illegal Dereference of a pointer. It reports a program point of interest as safe or unsafe when sufficient information is available or may be computed by these tools. In the other case, if sufficient information is not available or may not be computed statically, it reports such program points as warnings/alarms. The program points of interest correspond to the locations/points in the code where the presence of such common programming defects is to be checked/detected.

Static analysis usually results in plurality of warnings. A user is supposed to analyze each warning manually. Each warning requires dealing with the utmost care, as the analysis of the warnings is required to verify a software application. The review of the warnings provides an assurance that there will not be a system failure or an error at run-time occurring due to the common programming errors. This manual review of the warnings is costly, highly time consuming, and tedious. Also, a repetitive and monotonous manual review of warnings makes the analysis work of a user less interesting.

Current research areas are focusing toward making static analysis more precise in nature, so that fewer warnings are generated. The presently-available static analysis tools only inform a user whether a program point of interest is safe or unsafe, and the tools do not assist in providing any useful information or help to a user so that the review of warnings gets easier for the user. Moreover, during the review of a warning, the user is supposed to traverse a lot of code to collect the necessary information that is required in determining the warning as safe or unsafe. This code traversal generally costs more than half of the time that is spent during the manual reviews. Also, the manual process to collect the required information is error-prone, as a user may not correctly identify the required information on very large size applications.

SUMMARY

This summary is provided to introduce aspects related to systems and methods for facilitating verification of a software code and the concepts are further described below in the detailed description. This summary is not intended to identify essential features of the subject matter, nor is it intended for use in determining or limiting the scope of the subject matter.

In one implementation, a system for facilitating verification of a software code is disclosed. The system includes a processor and a non-transitory memory coupled to the processor. The processor executes a plurality of modules stored in the memory. The plurality of modules includes a selecting module, a determining module, and a user-interface module. The selecting module may select a first program point indicating a warning generated for a software code to be verified. The first program point has a programming expression comprising a set of variables with a set of modification points. Further, the warning is generated when a value of at least one variable of the set of variables is not statically determined. Further, the determining module may determine a review-assisting information for a user to judge whether the value associated with the at least one variable leads the first program point to a safe condition or to an unsafe condition. The review-assisting information may be determined by transitively locating the set of modification points, from the software code, assigning values to the at least one variable. The review-assisting information may be further determined by transitively locating a controlling condition indicated by a second program point associated with the at least one variable, from the software code, if the value assigned at the set of modification points are incapable of suggesting to the user about the safe or the unsafe condition of the first program point. Further, the controlling condition may help the user in determining about the safe or the unsafe condition of the first program point. The review-assisting information may be further determined by locating a path amongst the set of modifications points, the controlling condition, and the first program point. Further, the user-interface module may present the review-assisting information to the user by filtering-out non-useful modification points from the set of modification points in order to identify one or more relevant modification points. The user-interface module may further display the one or more relevant modification points or the controlling condition to the user. The one or more relevant modification points or the controlling condition may indicate root-causes for the warning generated, thereby facilitating the verification of the software code.

In another implementation, a method for facilitating verification of a software code is disclosed. The method may include providing a processor and a non-transitory memory coupled to the processor, where the processor executes a plurality of modules stored in the memory, and where the plurality of modules include a selecting module, a determining module, and a user-interface module. The method may further include selecting, via the selecting module, a first program point indicating a warning generated for a software code to be verified. The first program point has a programming expression comprising a set of variables with a set of modification points. Further, the warning is generated when a value of at least one variable of the set of variables is not statically determined. The method may comprise a step of determining, via the determining module, a review-assisting information for a user to judge whether the value associated with the at least one variable leads the first program point to a safe condition or to an unsafe condition. The review-assisting information may be determined by transitively locating the set of modification points, from the software code, that assigns the value to the at least one variable. The review-assisting information may be further determined by transitively locating a controlling condition indicated by a second program point associated with the at least one variable, from the software code, if the value assigned at the set of modification points is incapable of suggesting to the user about the safe or the unsafe condition of the first program point. Further, the controlling condition may help the user in determining about the safe or the unsafe condition of the first program point. The review-assisting information may be determined by locating a path amongst the set of modifications points, the controlling condition, and the first program points. Further, the method may be provided for presenting, via the user-interface module, the review-assisting information to the user. The review-assisting information may be presented by filtering-out non-useful modification points from the set of modification points in order to identify one or more relevant modification points. The review-assisting information may be further presented by displaying the one or more relevant modification points or the controlling conditions to the user. The one or more relevant modification points or the controlling conditions may indicate a root-cause for the warning generated, thereby facilitating the verification of the software code.

In yet another implementation, a non-transitory computer readable medium embodying a program executable in a computing device for facilitating verification of software code is disclosed. The program may include a program code for selecting a first program point indicating a warning generated for a software code to be verified. The first program point has a programming expression comprising a set of variables with a set of modification points. Further, the warning is generated when a value of at least one variable of the set of variables is not statically determined. Further, the program may include a program code for determining a review-assisting information for a user to judge whether the value associated with the at least one variable leads the first program point to a safe condition or to an unsafe condition. The review-assisting information is determined by transitively locating the set of modification points, from the software code, that assigns the values to the at least one variable. The review-assisting information may be further determined by transitively locating a controlling condition indicated by a second program point associated with the at least one variable, from the software code, if the value assigned at the set of modification points is incapable of suggesting to the user about the safe or the unsafe condition of the first program point. The controlling condition may help the user in determining about the safe or the unsafe condition of the first program point. The review-assisting information may be further determined by locating a path amongst the set of modifications points, the controlling condition, and the first program points. Further, the program may include a program code for presenting the review-assisting information to the user. The review-assisting information may be presented by filtering-out non-useful modification points from the set of modification points in order to identify one or more relevant modification points. The review-assisting information may be further presented by displaying the one or more relevant modification points or the controlling condition to the user, wherein the one or more relevant modification points or the controlling condition indicates a root-cause for the warning generated, thereby facilitating verification of the software code.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

FIGS. 3A-3F illustrate different examples for facilitating verification of the software code in detail, in accordance with an embodiment of the present subject matter.

DETAILED DESCRIPTION

Figure 1:
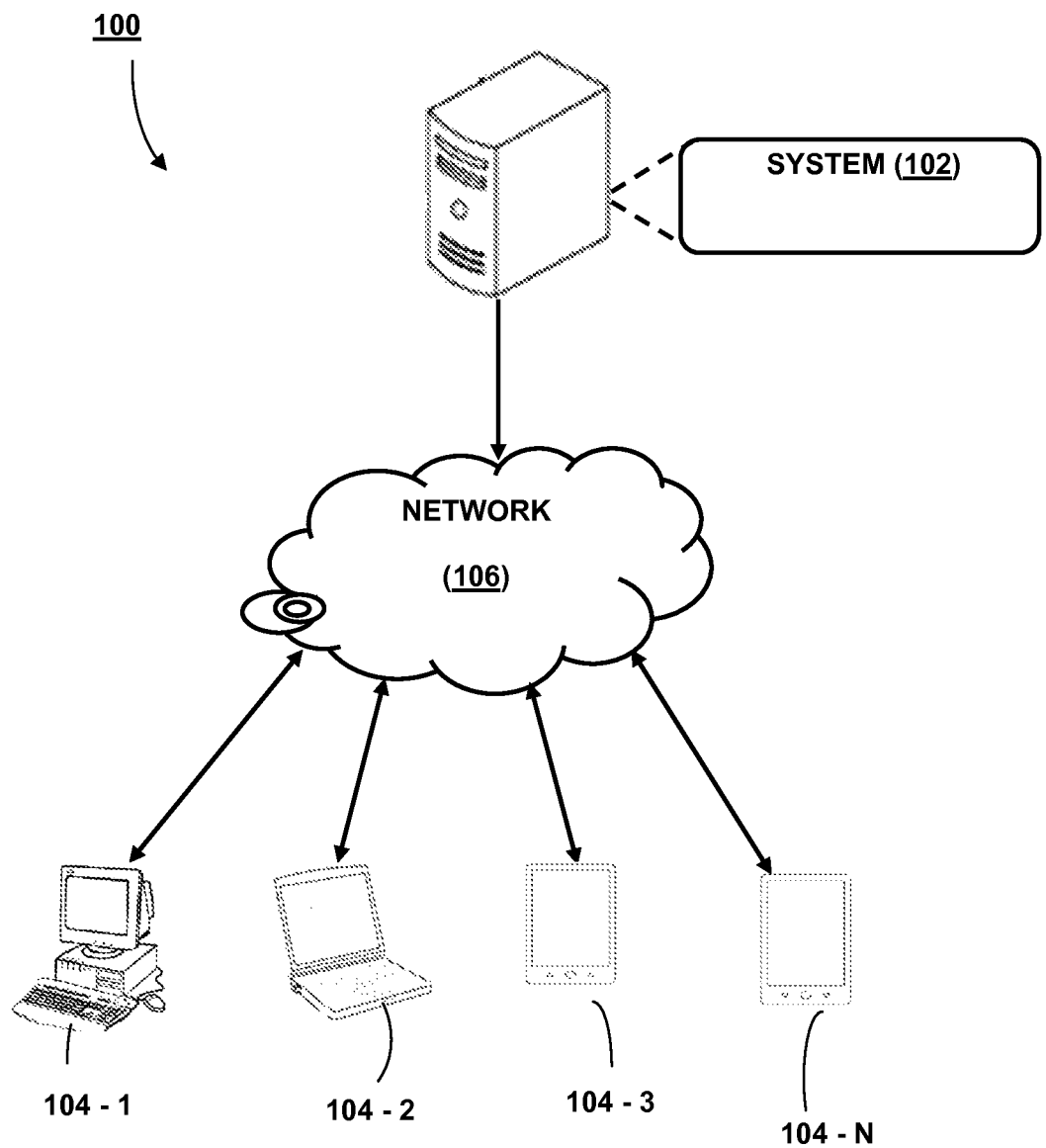
FIG. 1 illustrates a network implementation of a system for facilitating verification of software code, in accordance with an embodiment of the present subject matter.

Systems and methods for facilitating verification of a software code are described. These software codes are generally implemented in embedded systems. But, before deployment or release of the embedded systems, verification of the software codes is required to prevent failure of these embedded systems during run-time. The first step for performing the verification is analyzing the software code having a plurality of program points with the help of static analysis tools available in market. Post analysis, these tools report program points of the software code as safe, unsafe, or warnings. The program points reported as safe indicate that there is no defect/bug present in the software code at these program points, whereas, the program points reported as unsafe clearly intimates to the user about a programming bug present in the software code at those program points. On the other hand, when the program points are reported as warnings, this indicates to the user that the static analysis tool is unsure whether these program points are in a safe or an unsafe condition.

The warnings generated are usually large in number, and each warning needs manual attention for determining whether the program points reported as warning fall under the safe or unsafe condition. For analyzing this manually, the user has to check each of the program points reported as a warning from the software code. During manual analysis, the user may have to traverse a lot of the software code for determining whether the program point reported as a warning is safe or unsafe. Sometimes, it becomes tedious for the user to maintain his/her focus while performing the analysis. There is no assisting information available for guiding and focusing the user's attention during this manual analysis. To prevent such conditions, the present disclosure provides a user-interface enabled system and method for automatically determining and presenting review-assisting information to the user for efficient review of the warnings.

According to embodiments of present disclosure, the review-assisting information may be divided into two categories—i.e., a set of modification points and a set of controlling conditions—in order to expedite the review process. The review-assisting information (the set of modification points and the controlling conditions) may be presented systematically in such a manner that less effort and time is required from the user for reviewing the warnings. Further, the system may determine paths between the modification points and the program point indicating the warning for the software code, or any other modification point obtained during the review process. While presenting the review-assisting information, the paths are displayed in terms of the controlling conditions and call points by filtering-out other information/statements (e.g., assignment statements, irrelevant function calls) from the software code. Due to such filtration, the system may take less time in displaying only useful/relevant review-assisting information to the user. Thus, the system works in a much more efficient manner while displaying the useful/relevant review-assisting information on a user-interface. This in turn makes a hassle-free experience for the user involved in reviewing the warnings for verification of the software code.

While aspects of described system and method for facilitating verification of the software code may be implemented in any number of different computing systems, environments, and/or configurations, the embodiments are described in the context of the following exemplary system.

Referring to FIG. 1, a network implementation 100 of a system 102 for facilitating verification of software code is illustrated, in accordance with an embodiment of the present subject matter. Although the present subject matter is explained considering that the system 102 is implemented as a computing system, it may be understood that the system 102 may also be implemented as a variety of computing systems, such as a laptop computer, a desktop computer, a notebook, a workstation, a mainframe computer, a server, a network server, a tablet, a mobile phone, and the like. In one implementation, the system 102 may be implemented in a cloud-based environment. It will be understood that the system 102 may be accessed by multiple users through one or more user devices 104-1, 104-2, 104-3, . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
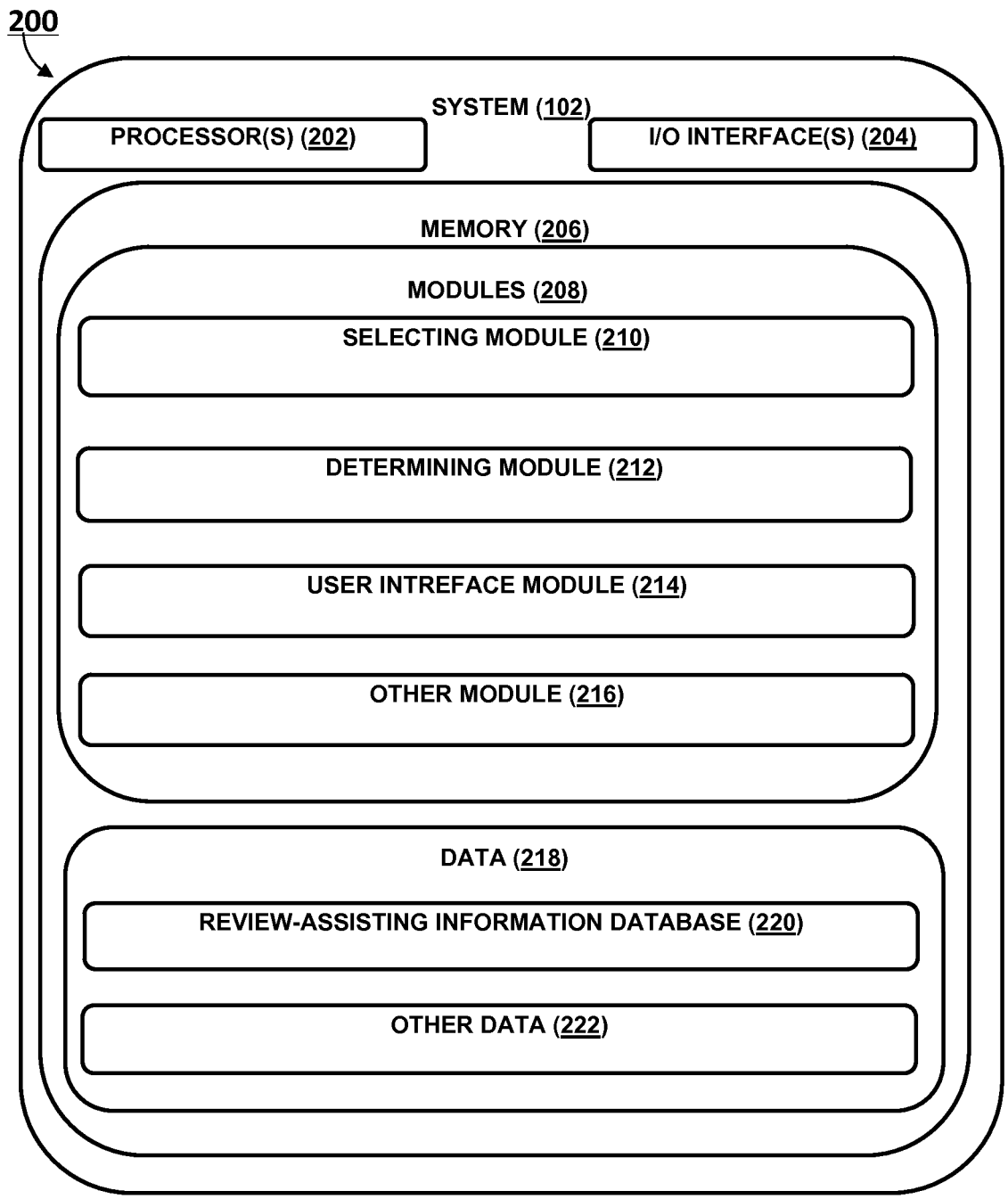
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 218.

The modules 208 include routines, programs, objects, components, data structures, etc., which perform particular tasks or implement particular abstract data types. In one implementation, the modules 208 may include a selecting module 210, determining module 212, user-interface module 214, and other modules 216. The other modules 216 may include programs or coded instructions that supplement applications and functions of the system 102.

The data 218, amongst other things, serves as a repository for storing data processed, received, and generated by one or more of the modules 208. The data 218 may also include rules and review-assisting information database 220, and other data 222.

Figure 3B:
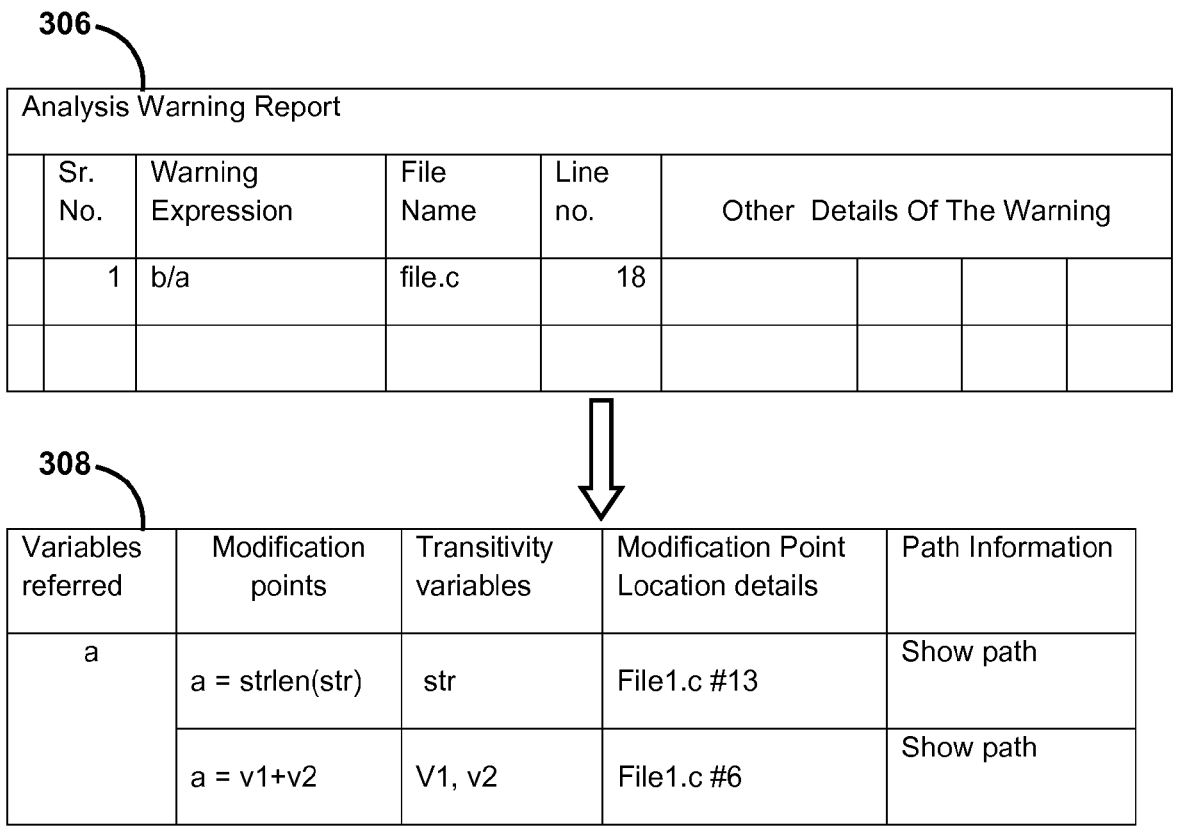

Reference is now made to FIGS. 3A-3B, 3C-3D, and 3E-3F, which illustrate different examples for facilitating verification of the software code, in detail, implemented by the system 102, in accordance with an embodiment of the present subject matter. A first example is shown in FIGS. 3A-3B, illustrating a requirement of the reporting of a set of modification points. In this example, the software code to be verified is shown as 302 in FIG. 3A. The software code 302 comprises plurality of program points (Lines 1-19). According to embodiments of present disclosure, the selecting module 210 of the system 102 may select a first program point 304 (line 18) indicating a warning generated for the software code 302 to be verified. It can be seen from FIG. 3A that the first program point 302 has a programming expression "c=b/a" having set of variables as "a," "b," and "c." Since the value of the variable "a" (denominator) cannot be determined statically, the warning is generated for Zero-Division (Divide-by Zero) verification. The warning generated is shown in table 306 of FIG. 3B.

Further, to judge whether the warning generated is safe or unsafe, the user may have to collect review-assisting information manually from the software code 302. For collecting the review-assisting information, the user may have to traverse a lot through the software code 302. Since, the variable "a" is the denominator variable, and it's not assigned in function "func" of software code 302, the user has to locate all modification points which assign values to the variable "a." In this example, the user has to identify/locate call points of the function "func" (that are at the lines 7 and 14 of the software code 302) and trace backwards for those program points at which the variable "a" is modified. To avoid such user intervention, the determining module 212 of the system 102 may automatically determine a set of modification points at lines 6 and 13 as the review-assisting information for the user. Further, the user-interface module 214 of the system 102 may display the review assisting information as shown in table 308 of FIG. 3B.

On clicking on the "show path" button under "Path information" column of the table 308, a path may be displayed to the user from the modification points (lines 6 or 13) to the first program point, i.e., the warning. The path generated may be presented in another window or in the same or in a separate pop-up form. Further, on clicking on the "File1.c#13" under the "Modification point location details" column, a separate window may pop-up displaying File1.c and the line 13 highlighted in a separate source code window. Further, in this source code window, the statements/code included in the paths shown after clicking the "show path" button may also get highlighted. Further, on clicking on the "V1, v2" under "Transitivity variables" column of the table 308, a separate pop-up window may be generated displaying the modification points of the variables "V1" and "V2" at the location mentioned under column "Modification point location details." This way, the user-interface module 214 may display the review-assisting information to the user for verification of the software code 302.

Figure 3D:
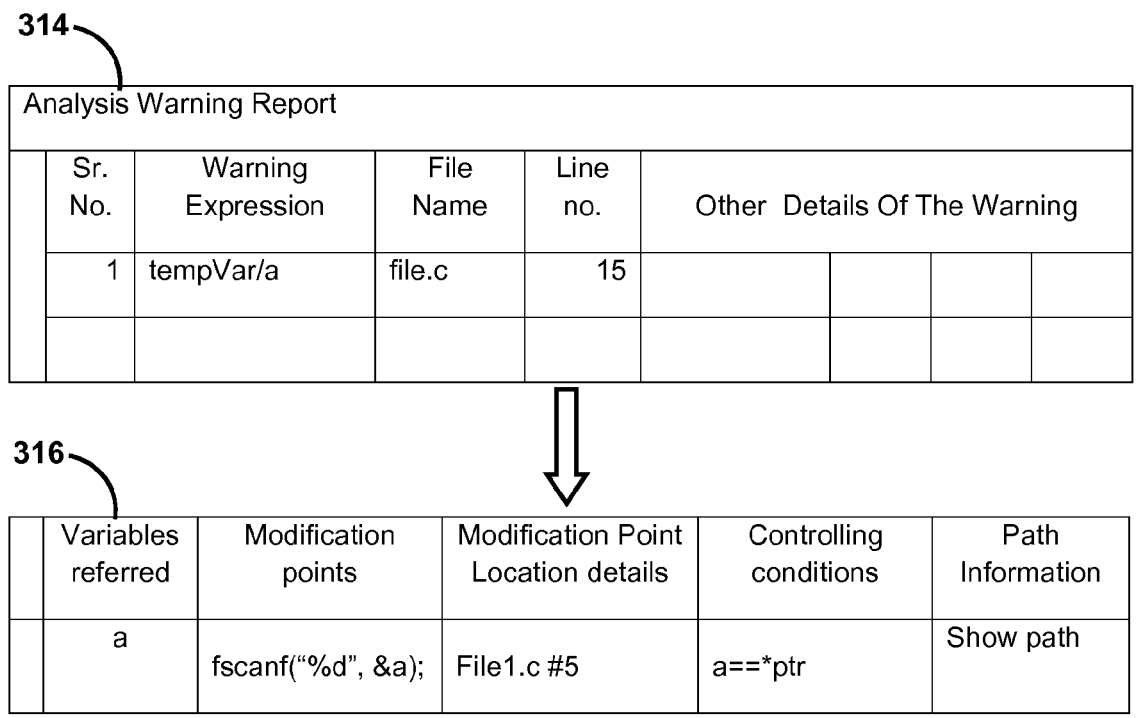

A second example is shown in FIGS. 3C-3D, illustrating a requirement of reporting of controlling condition. According to this example, the software code to be verified is shown as 310 of FIG. 3C. The software code 310 comprises a plurality of program points (Lines 1-17). The selecting module 210 of the system 102 may select the first program point indicating the warning generated for the software code 310. In this example, the first program point selected is shown as 312 (Line 15) of the FIG. 3C. The first program point 312 has a programming expression "c=tempVar/a" comprising a set of variables as "a," "tempVar," and "c." In this example, the value of the variable "a" (i.e., the denominator) cannot be determined statically, and hence the warning is generated for the Zero-Division verification. The warning generated is shown in table 314 of FIG. 3D.

Now, in this case, the determining module 212 may determine the review-assisting information in two categories (i.e., "set of modification points" and "controlling condition"). At first, the determining module 212 may determine the set of modification points which assign values to the variable "a". In this example, only one modification point is determined at line 5 of the software code 310. But, at this point, the modification point determined (i.e., Line 5) does not help/incapable of suggesting the user to judge whether the warning generated is safe or unsafe.

In this situation, the user may have to manually check in the software code 310 to locate any controlling conditions for avoiding the warning (Zero-division). In a first instance, the controlling condition may be identified at line 13 of the software code 310. It can be seen at line 13 that the variable "a" is compared with a pointer "*ptr." From this controlling condition, i.e., if (a==*ptr), the variable "a" may be determined as "non-zero" at line 15 only if the "*ptr" is non-zero. For this purpose, the user may have to further check for the values of the "*ptr." and for this he/she may have to locate the pointer assignment at line 8 of the software code 310. At line 8, the pointer assignment indicates that the "*ptr" value is the value of variable "b." Now, the user's focus is shifted from the variable "a" to the variable "b." In next instance, the modification point associated with the variable "b" is determined, i.e., line 7 of the software code 310.

It can be observed from above two paragraphs, that the user has to traverse from Line 5-to-Line 13-to-Line 8-to-Line 7. Traversing through these lines takes a lot of effort and time of the user. Thus, according to this example, the determining module 212 may determine the controlling condition associated with the variable "a" as the review-assisting information. Further, the review-assisting information in both the categories (i.e., the modification points and the controlling condition) may be presented to the user by the user-interface module 214. Further, the determined review-assisting information may be shown in table 316 of FIG. 3D. It can be seen from the table 316 that the modification point "fscanf("% d", &a);" along with the controlling condition "a==*ptr" is shown under the "Modification Points" column and "Controlling condition" columns, respectively. Further, upon clicking on "File1.c#5" under the "Modification Point Location details" column, the corresponding source code may be displayed in a separate source code window. Further, the user may also get more details of the "*ptr" (i.e., pointer information, all modification points related to the *ptr, etc.) by clicking on "a==*ptr" under the "Controlling condition" column of the table 316. This information may be displayed on another pop-up window. This way, the review-assisting information (modification points and the controlling conditions) are displayed to the user for facilitating verification of the software code 310.

Figure 3F:
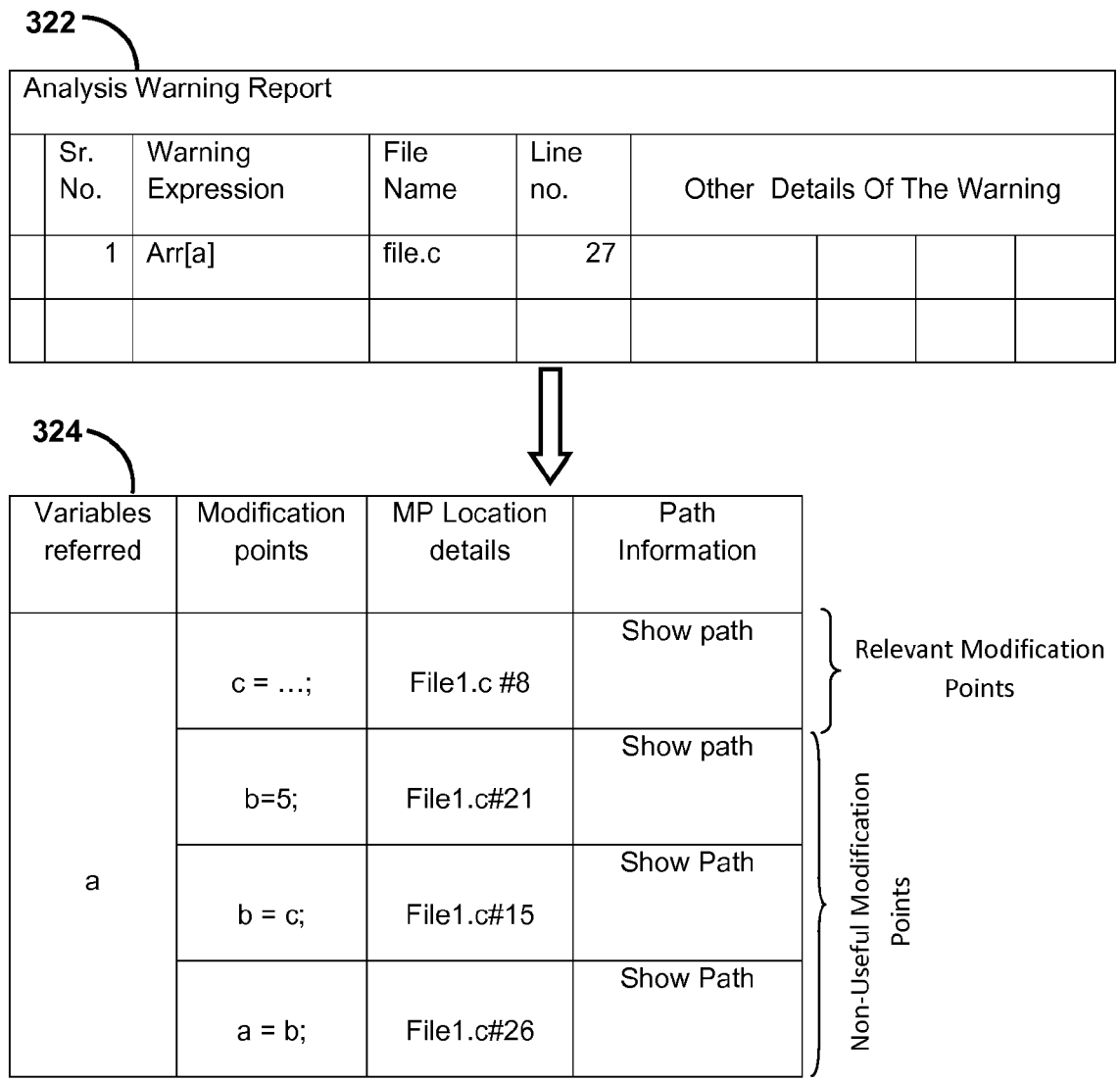

Now, a third example is shown in FIGS. 3E-3F, illustrating a requirement of on-demand reporting of the modification points/controlling conditions and the transitivity in the review-assisting information. The software code to be verified in this example is shown as 318 of FIG. 3E. The software code 318 comprises a plurality of program points (Lines 1-28). The selecting module 210 of the system 102 may select the first program point 320 (at Line 27) indicating a warning generated for the software code 318. The warning generated may be seen in table 322 of the FIG. 3F. Further, the first program point selected has a programming expression "c=arr [a]" having a set of variables "a" and "c." In this case, the warning is generated for an Array Index Out of Bound (AIOB) verification. In the AIOB verification, the index values (values of the variable "a") are checked to determine if they are always within the size/bound of the array (i.e., 10). It is reported as a warning because the values of the variable "a" cannot be determined statically. Thus, it is required to check if the value of the variable "a" always takes values between 0 and 9, both included.

The process performed in this example starts with identification of the set of modification points, which assigns value to the variable "a." In a first instance, the modification point identified corresponding to the variable "a" is at line 26 of the software code 318. Line 26 indicates that the values are taken from variable "b"; that is, the values are transitively taken from "b." Now, the variable of interest becomes "b" instead of "a" for checking the values. Thus, it requires identifying the modification points associated with the variable "b." The modification points identified for the variable "b" are Lines 21 and 15 of the software code 318. The modification point at Line 21 indicates that it always assigns value 5 to the variable "b." Further, the modification point at Line 15 indicates that it assigns variable "c" to the variable "b."

Thus, due to transitivity, now the variable "c" is the variable of interest and manual analysis may be required for identifying all the modification points that assign values to the variable "c." Now, the next modification point identified for the variable "c" is at line 8 of the software code 318. Thus, on basis of the modification point (line 8), the user may be able to identify that the value assigned for the variable "c" is 0 to 9. With such deep analysis and code traversal, the warning at the first program point (i.e., at line 27) may be reviewed as "safe."

Thus, the overall process performed for identifying the set of modification points (i.e., Line 26, Line 21, Line 15, and Line 8) as explained in the above paragraphs may require considerable effort and time of the user. To prevent such issues, the determining module 212 of the system 102 may determine the set of modification points (Line 26, Line 21, Line 15, and Line 8) from the software code 318 as the review-assisting information. In this example, it may be observed that the determining module 212 has not determined any controlling conditions because the determined set of modification points are capable of suggesting to the user whether the warning generated is safe or unsafe.

After identification of the set of modification points, the next step performed by the user-interface module 214 of the system 102 is to present the review-assisting information to the user. According to embodiments of present disclosure, the user-interface module 214 may filter out non-useful modification points from the set of modification points (Line 26, Line 21, Line 15, and Line 8). This filtering is performed depending on the type of the warning and the values assigned by the modification points. For example, the user-interface module 214 may filter out line 21 because the warning point at line 27 is always safe. Further, in this example, the user-interface module 214 may filter out Line 26 and Line 15, considering them to be non-useful modification points since these points indicate transitivity in value assignments. After filtering, the user-interface module 214 may display only relevant modification points, i.e., Line 8, to the user on the user-interface. Further, the non-useful modification points (i.e., Lines 26, 21, and 15), as shown in the table 324, are not displayed by the user-interface module 214 while presenting the review-assisting information to the user. The relevant modification points, shown in table 324 of the FIG. 3F, indicate root-causes for the warning generated. Further, on clicking on "show path" button under the "Path information" column of the table 324, a path from the set of modification points to the warning generated (i.e., the first program point) may be displayed to the user. The path generated may be presented to the user in a separate window or pop-up form or in the same form. Also, the non-useful modification points may be displayed on the user interface based on demand of the user. According to embodiments of present disclosure, the non-useful modification points may be displayed in distinguishing colors to the user in a separate window. Thus, only the relevant modification point (Line 8) is displayed to the user for facilitating the verification of the software code 318. Further, the review-assisting information (set of modification points and controlling conditions) discussed in above examples may be stored in the review-assisting information database 220.

Figure 4:
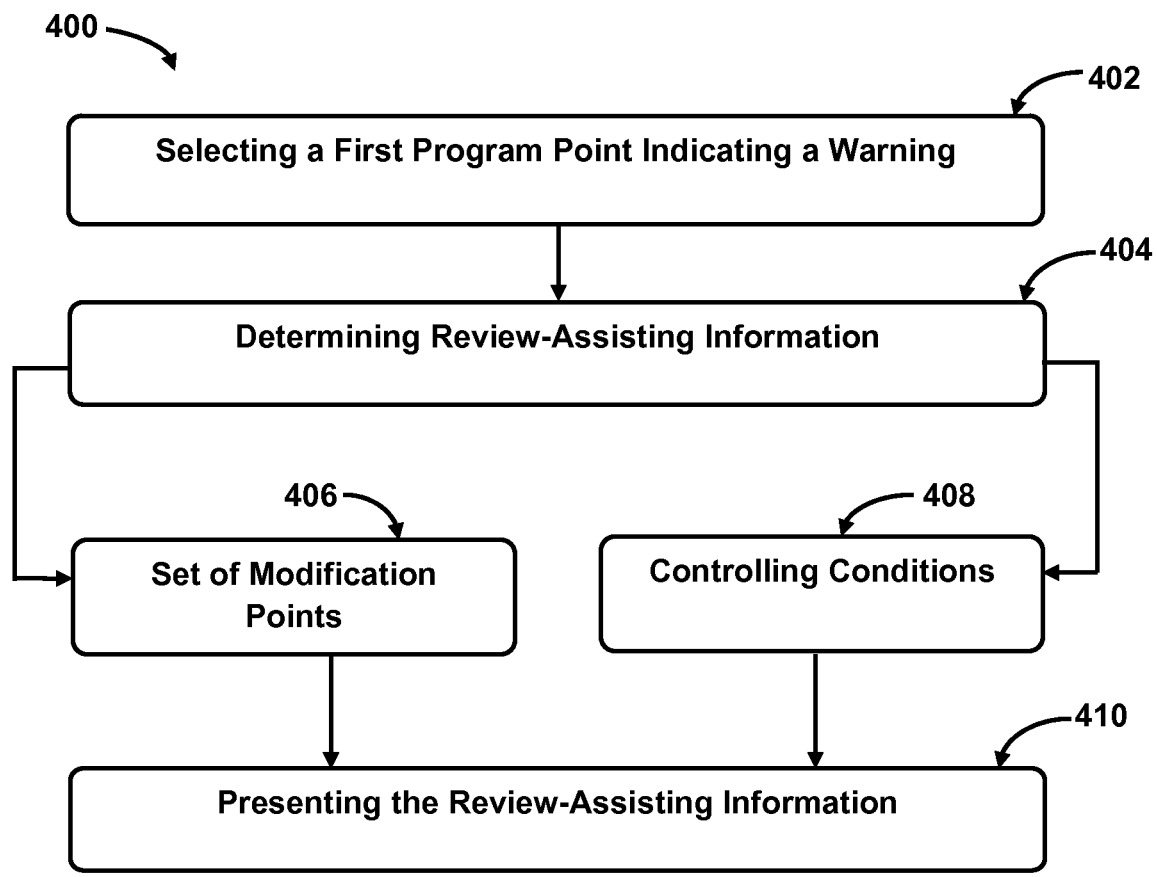
FIG. 4 illustrates a method for facilitating verification of the software code, in accordance with an embodiment of the present subject matter.

Referring now to FIG. 4, method for facilitating verification of the software code is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

At block 402, a first program point indicating a warning may be selected from the software code to be verified. Further, the first program point has a programming expression comprising set of variables. The warning is generated when a value of at least one variable of the set of variables is not statically determined.

At block 404, review-assisting information may be determined for a user to judge whether the value associated with the at least one variable leads the first program point to a safe or an unsafe condition.

At block 406, the determined review-assisting information may comprise a set of modification points, from the software code, assigning values to the at least one variable.

At block 408, the determined review-assisting information may comprise a controlling condition indicated by a second program point associated with the at least one variable from the software code. Further, the controlling condition is determined when the values assigned at the set of modification points are incapable of suggesting to the user about the safe or the unsafe condition of the first program point. Further, the controlling condition may help the user in determining about the safe or the unsafe condition of the first program point (i.e., the warning).

At block 410, the review-assisting information may be presented to the user by filtering out non-useful modification points from the set of modification points in order to identify one or more relevant modification points. The review-assisting information may be further presented by displaying the one or more relevant modification points and the controlling conditions, both indicating the root-causes for the warning generated. The presented review-assisting information further may consist of paths computed between two program points specified by the user. Thus, verification of the software code is facilitated with the help of such review-assisting information displayed to the user.

Although implementations for methods and systems for facilitating verification of the software code have been described in language specific to structural features and/or methods, it is to be understood that the appended claims are not necessarily limited to the specific features or methods described. Rather, the specific features and methods are disclosed as examples of implementations for providing visualization of the rules and the exceptions extracted from the data set.

What is claimed is:
1. A method for facilitating verification of a software code, the method comprising:
providing a processor and a non-transitory memory coupled to the processor, wherein the processor executes a plurality of modules stored in the memory, and wherein the plurality of modules include a selecting module, a determining module, and a user-interface module;
selecting, via the selecting module, a first program point indicating a warning generated for a software code to be verified, wherein the first program point has a programming expression comprising a set of variables associated with a set of modification points, and wherein the warning is generated when a value of at least one variable of the set of variables is not statically determined;
determining, via the determining module, a review-assisting information to determine whether the value associated with the at least one variable leads the first program point to a safe condition or to an unsafe condition, wherein determining the review-assisting information comprises locating at least one of:
the set of modification points, from the software code, assigning the value to the at least one variable, and
a controlling condition, from the source code, comprising a second program point having a programming expression associated with the at least one variable, from amongst the set of variables, and a display of a path amongst the set of modification points, the controlling condition, and the first program point; and presenting, via the user-interface module, the review-assisting information to the user by:

filtering out non-useful modification points from the set of modification points, based on the values assigned by the modification points and identifying one or more relevant modification points, and systematically displaying the one or more relevant modification points or the controlling condition and the path amongst the set of modification points to the warning generated for the source code, wherein the one or more relevant modification points or the controlling condition indicates a root cause for the warning generated, thereby facilitating verification of the software code.

2. The method of claim 1, wherein the warning is generated based on static analysis performed on the software code, wherein the static analysis further results in the safe conditions and the unsafe conditions for the software code.

3. The method of claim 1, wherein the non-useful modification points, after being filtered, are displayed based on demand of the user, wherein the non-useful modification points are displayed to the user in distinguishing representations relative to the one or more relevant modification points or the controlling condition.

4. The method of claim 1 further comprising transitively displaying the path in terms of the controlling conditions and function call points of the software code.

5. A system for facilitating verification of a software code, the system comprising:

a processor;

a non-transitory memory coupled to the processor, wherein the processor executes a plurality of modules stored in the memory, wherein the plurality of modules comprises:

a selecting module for selecting a first program point indicating a warning generated for a software code to be verified, wherein the first program point has a programming expression comprising a set of variables associated with a set of modification points, and wherein the warning is generated when a value of at least one variable of the set of variables is not statically determined;

a determining module for determining a review-assisting information to determine whether a value associated with the at least one variable leads the first program point to a safe condition or to an unsafe condition, wherein determining the review-assisting information comprises locating at least one of:

the set of modification points, from the software code, assigning the value to the at least one variable, and a controlling condition, from the source code, comprising a second program point having a programming expression associated with the at least one variable, from amongst the set of variables, and a display of a path amongst the set of modification points, the controlling condition, and the first program point; and a user-interface module for presenting the review-assisting information to the user by:

filtering out non-useful modification points from the set of modification points, based on the values assigned by the modification points and identifying one or more relevant modification points, and systematically displaying the one or more relevant modification points or the controlling condition and the path amongst the set of modification points to the warning generated for the source code, wherein the one or more relevant modification points or the controlling condition indicates a root cause for the warning generated, thereby facilitating verification of the software code.

6. The system of claim 5, wherein the selecting module generates the warning based on a static analysis performed on the software code, wherein the static analysis further results in the safe conditions and the unsafe conditions for the software code.

7. The system of claim 5, wherein the non-useful modification points, after being filtered, are displayed based on demand of the user, wherein the non-useful modification points are displayed to the user in distinguishing colors relative to the one or more relevant modification points or the controlling condition.

8. The system of claim 5, wherein the determining module further transitively displays the path in terms of the controlling conditions and function call points of the software code.

9. A non-transitory computer readable medium embodying a program executable in a computing device for facilitating verification of a software code, the program comprising:

a program code for selecting a first program point indicating a warning generated for a software code to be verified, wherein the first program point has a programming expression comprising a set of variables associated with a set of modification points, and wherein the warning is generated when a value of at least one variable of the set of variables is not statically determined;

a program code for determining a review-assisting information to determine whether a value associated with the at least one variable leads the first program point to a safe condition or to an unsafe condition, wherein determining the review-assisting information comprises locating at least one of:

the set of modification points, from the software code, assigning the value to the at least one variable, and a controlling condition, from the source code, comprising a second program point having a programming expression associated with the at least one variable, from amongst the set of variables, and a display of a path amongst the set of modification points, the controlling condition, and the first program point; and a program code for presenting the review-assisting information to the user by:

filtering out non-useful modification points from the set of modification points, based on the values assigned by the modification points and identifying one or more relevant modification points, and systematically displaying the one or more relevant modification points or the controlling condition and the path amongst the set of modification points to the warning generated for the source code, wherein the one or more relevant modification points or the controlling condition indicates a root cause for the warning generated, thereby facilitating verification of the software code.

* * * * *